United States Patent
Kay et al.

(10) Patent No.: US 7,065,425 B1
(45) Date of Patent: Jun. 20, 2006

(54) METROLOGY TOOL ERROR LOG ANALYSIS METHODOLOGY AND SYSTEM

(75) Inventors: Sarah A. Kay, Jefferson City, TN (US); Eric P. Solecky, Hyde Park, NY (US); Lin Zhou, LaGrangeville, NY (US)

(73) Assignee: Internaitonal Business Machines Corporation, Armonk, NY (US)

( * ) Notice: Subject to any disclaimer, the term of this patent is extended or adjusted under 35 U.S.C. 154(b) by 0 days.

(21) Appl. No.: 11/160,404

(22) Filed: Jun. 22, 2005

(51) Int. Cl.
*G06F 19/00* (2006.01)

(52) U.S. Cl. .................. 700/110; 700/121; 702/183

(58) Field of Classification Search ............ 700/95–97, 700/108, 110, 121
See application file for complete search history.

(56) References Cited

U.S. PATENT DOCUMENTS

| | | | |
|---|---|---|---|
| 6,303,395 B1 * | 10/2001 | Nulman | 438/14 |
| 6,456,894 B1 | 9/2002 | Nulman | |
| 6,671,570 B1 | 12/2003 | Schulze | |
| 6,727,106 B1 * | 4/2004 | Ankutse et al. | 438/5 |
| 2003/0176940 A1 | 9/2003 | Rangachari et al. | |
| 2004/0044435 A1 | 3/2004 | Hellig et al. | |
| 2004/0173464 A1 | 9/2004 | Parikh et al. | |
| 2004/0220688 A1 | 11/2004 | Behrisch et al. | |
| 2005/0010319 A1 | 1/2005 | Patel et al. | |
| 2005/0052197 A1 | 3/2005 | Watkins | |
| 2005/0136560 A1 | 6/2005 | Helwig | |

* cited by examiner

*Primary Examiner*—Jayprakash N. Gandhi
*Assistant Examiner*—Chad Rapp
(74) *Attorney, Agent, or Firm*—DeLio & Peterson, LLC; Peter W. Peterson; Ira D. Blecker

(57) ABSTRACT

A method of identifying failures in a metrology tool system used to measure desired dimensions in microelectronic features. Each metrology tool in the system runs a plurality of recipes for measuring desired dimensions in microelectronic features, with each recipe comprising a set of instructions for measuring at least one dimension in a microelectronic feature. The system includes an error log having stored thereon failures in measurement of microelectronic feature dimensions. The method includes determining normalized number of errors for the recipes used by the metrology tool from the failures stored in the error log, identifying one or more recipes having the greatest normalized number of errors in the error log, identifying, in a list of jobs to be performed by the metrology tool, the one or more identified recipes having the greatest normalized number of errors, and from the identified one or more recipes having the greatest normalized number of errors, determining the cause of the errors in the one or more recipes. The method then includes effecting a change in the one or more identified recipes having the greatest normalized number of errors to correct the errors therein and tracking a metrology tool job having the one or more recipes in which a change has been effected to determine whether the cause of errors has been corrected.

20 Claims, 3 Drawing Sheets

METROLOGY TOOL ERROR LOG ANALYSIS METHODOLOGY AND SYSTEM

BACKGROUND OF THE INVENTION

1. Field of the Invention

The present invention relates to the manufacture of semiconductor devices and, in particular, to the identification of failures in a metrology tool used to measure dimensions in microelectronic features.

2. Description of Related Art

During microelectronics manufacturing, a semiconductor wafer is processed through a series of tools that perform lithographic processing to form features and devices that form the microelectronic circuits and other features on the substrate of the wafer. Lithographic systems replicate circuit patterns by projecting the image of a mask pattern onto a wafer, and consist of imaging tools that expose patterns and processing tools that coat, bake and develop the substrates. The pattern may consist of features of varying size and density, all of which must be printed simultaneously with dimensional fidelity to design. As used herein, the term critical dimension (CD) or critical width refers to the smallest dimension of a pattern or feature that can be produced by the lithographic system. Such processing has a broad range of industrial applications, including the manufacture of semiconductors, flat-panel displays, micromachines, and disk heads.

Generally after each process step, any errors on the wafer are measured and controlled using metrology tools that image dimensions either on portions of the microelectronic circuits themselves or on specialized targets printed on the wafer. Such circuit portions, targets, and other features shall be generally referred to as microelectronic features, unless otherwise specified. The metrology tools use so-called recipes to make measurements of desired microelectronic features. Such recipes generally comprise maps of the microelectronic features and commands to the tools optical measurement systems to align the particular feature to be measured with the tool measurement device, by rotation and translation of the wafer with respect to the tool, and to use the required tool measurement device. A typical tool measurement device may use purely optical schemes to obtain the respective measurements, examples of these types of tools include overlay, scatterometry and film thickness. Other tool measurement devices include an optical device in conjunction with a scanning electron, atomic force microscopy or some other combination where each tool measurement device is designed to measure specific process steps along the way during chip fabrication. From this point forward measuring a desired dimension of a microelectronic feature can mean measuring critical dimensions, overlay, film thickness, depth and the like.

As metrology tools become more and more advanced, they require more skill on the part of the user. The experience needed to create measurement recipes is quickly becoming out of the reach of the average user. Additionally, the number of process steps being measured on metrology tools is growing with each new generation chip process. For 65 nm node chip technology, the chip may pass through a critical dimension (CD) metrology tool about 70 times in the course of its processing. Each of those 70 passes requires a unique recipe to be constructed. Many times dozens of different types of chips are being created using the 65 nm node chip technology, with each of the same process steps for each unique chip requiring a unique metrology recipe. Such CD metrology recipes can easily number in the thousands.

Knowing that a high level of expertise is needed to create a robust recipe, many chip fabricators do not have sufficient manpower to allow all of these thousands of recipes to be created as robustly as needed. In many cases the recipes created do not run robustly. Over time this becomes a significant issue that directly affects the cycle time needed to build a fully functioning chip; in some extreme cases it affects yield. Since it could take a year or more to master programming recipes on some metrology tools, poorly written metrology recipes create major problems in metrology tool management, cycle time and process debug.

With the thousands of recipes that exist on metrology tools used to monitor the processes in making chips, there is a need for effective way of determining which recipes are most problematic. Further, there are many opportunities for a production lot at a particular process step to fail using the metrology recipe created to monitor that process step. Given that a chip fabricator may have a dozen or more CD tools measuring all the different chips at different process steps during their lifetime, coupled with many poorly written recipes, the amount of recipe failures could reach levels in the tens of thousands within a fairly short time period. A recipe failure may pause the metrology tool, resulting in a lot that did not measure robustly to go on hold and require investigation. This and other situations can, in turn, slow down the chip construction and directly impact the cycle time. Without an effective way of determining the problematic recipe, much time and resources may be wasted.

SUMMARY OF THE INVENTION

Bearing in mind the problems and deficiencies of the prior art, it is therefore an object of the present invention to provide a method of identifying, from numerous metrology tool recipe failures, the most problematic recipes that need to be fixed.

It is another object of the present invention to provide a method of determining where to begin the process of fixing metrology tool recipes that have failed.

A further object of the invention is to provide an automated method of converging on the most problematic metrology tool recipes and determine root cause.

It is yet another object of the present invention to provide a method of identifying and repairing metrology tool recipe failures using error logs that exist on metrology tools.

Still other objects and advantages of the invention will in part be obvious and will in part be apparent from the specification.

The above and other objects, which will be apparent to those skilled in the art, are achieved in the present invention which is directed to a method of identifying failures in a metrology tool used to measure desired dimensions in microelectronic features comprising providing a metrology tool running a plurality of recipes for measuring desired dimensions in microelectronic features, each recipe comprising a set of instructions for measuring at least one dimension in a microelectronic feature, and providing an error log for the metrology tool, the error log having stored thereon failures in measurement of microelectronic feature dimensions. The method includes determining normalized number of errors for the recipes used by the metrology tool from the failures stored in the error log, identifying one or more recipes having the greatest normalized number of errors in the error log, identifying, in a list of jobs to be performed by the metrology tool, the one or more identified recipes having the greatest normalized number of errors, and from the identified one or more recipes having the greatest normalized number of errors, determining the cause of the errors in the one or more recipes. The method then includes effecting a change in the one or more identified recipes having the greatest normalized number of errors to correct the errors therein and tracking a metrology tool job having the one or more recipes in which a change has been effected to determine whether the cause of errors has been corrected.

Prior to identifying the recipes having the greatest normalized number of errors, the method preferably includes determining whether the errors are caused by a recipe used by the metrology tool, and using only the errors caused by a recipe to identify the one or more recipes having the greatest normalized number of errors and determine the cause of the errors therein. If the errors are not caused by a recipe used by the metrology tool, the method may include repairing the metrology tool having the failure not caused by a recipe.

There may be provided a plurality of the metrology tools, with each tool having a plurality of recipes, and the error log has stored thereon failures in measurement of microelectronic feature dimensions for the plurality of metrology tools. The method may include identifying common recipes having errors in a plurality of the metrology tools, and determining the cause of the errors in such common recipes.

The metrology tool failures stored in the error log may include alignment errors, pattern recognition errors and dimensional measurement errors, hardware failures and software failures, including instances of rebooting. The method may further include summarizing failures stored in the error log, and storing summarized failure data in a database.

In another aspect, the present invention is directed to a computer program product comprising a computer useable medium including a computer readable program for identifying failures in a metrology tool system used to measure desired dimensions in microelectronic features, wherein the metrology tool system includes a metrology tool adapted to run a plurality of recipes for measuring desired dimensions in microelectronic features, with each recipe comprising a set of instructions for measuring at least one dimension in a microelectronic feature. The metrology tool has an error log in a database having stored thereon failures in measurement of microelectronic feature dimensions. The computer readable program when executed on the computer causes the computer to determine normalized number of errors for the recipes used by the metrology tool, from the failures stored in the error log, identify one or more recipes having the greatest normalized number of errors in the error log, and identify, in a list of jobs to be performed by the metrology tool, the one or more identified recipes having the greatest normalized number of errors.

The computer readable program when executed on the computer further causes the computer to summarize failures stored in the error log, and store summarized failure data in a database.

Where the metrology tool system includes a plurality of the metrology tools, each tool has a plurality of recipes, and the error log has stored thereon failures in measurement of microelectronic feature dimensions for the plurality of metrology tools. In such case, the one or more recipes having the greatest normalized number of errors may be identified for the metrology tools. The computer readable program when executed on the computer may further cause the computer to summarize failures stored in the error log, and store summarized failure data in a database.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
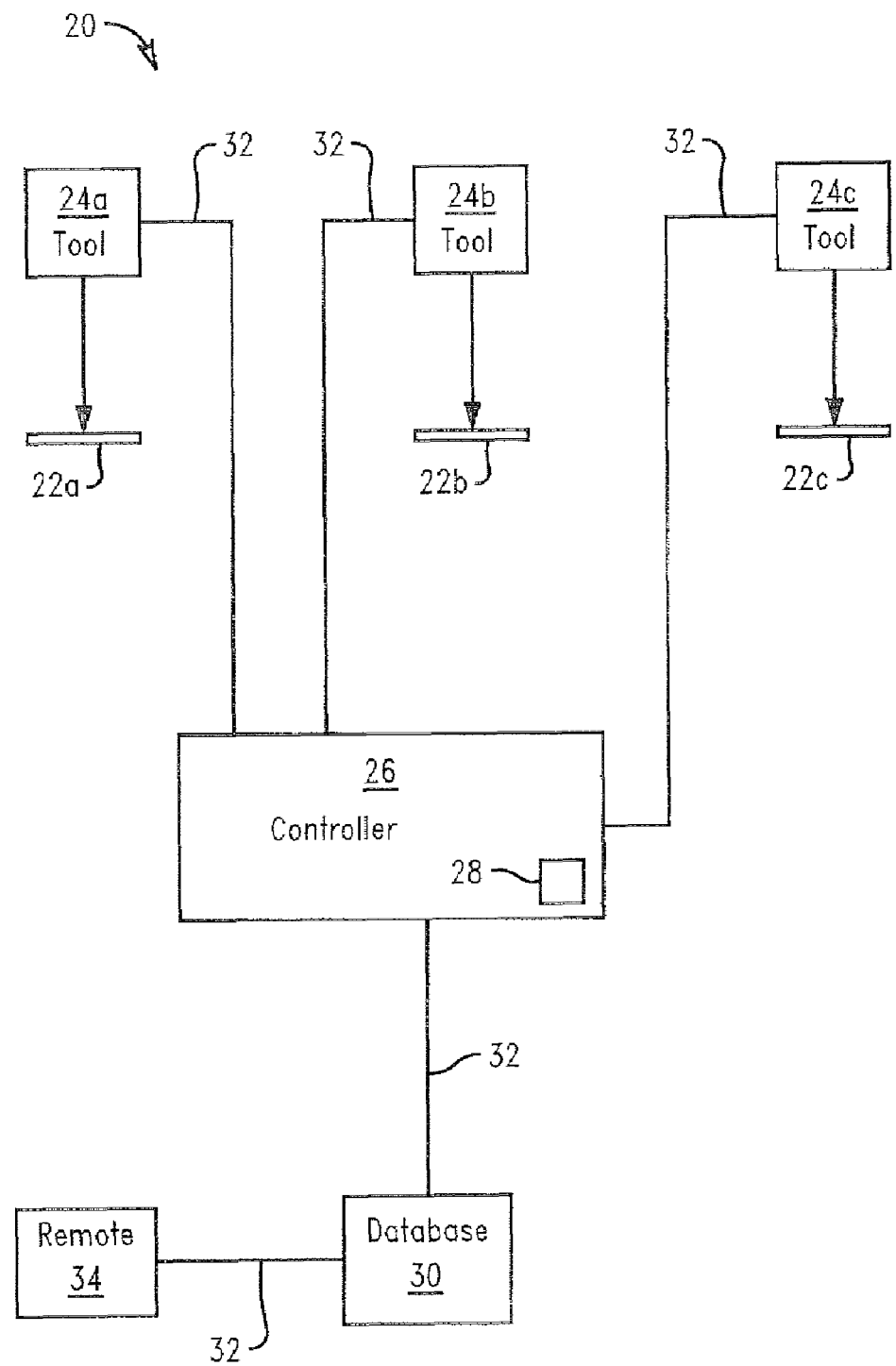
FIG. 1 is a schematic of the metrology tool system capable of practicing the method of the present invention.

In describing the preferred embodiment of the present invention, reference will be made herein to FIGS. 1–3 of the drawings in which like numerals refer to like features of the invention.

The method of identifying failures in a metrology tool used to measure desired dimensions in microelectronic features described herein permits the user to quickly converge on the most problematic recipes and determine root cause using the error logs that typically exists on each and every metrology tool. This process can be automated, and when run periodically, gives the user the information needed to begin addressing the worst-performing recipes with solutions, thereby causing the failure rate to decrease over time.

As described above, metrology tools may encounter failures during the course of running a recipe to make microelectronic feature measurement, and a metrology tool error log records every recipe and tool failure over time. If such an error log does not exist on an existing tool, one may be established by one skilled in this art. The information or data in the error log may be accessed or sent to a database and processed using the methodology described below. As also described above, each recipe has numerous parts to it that could fail when measuring a given process step. A typical CD recipe may have the following categories captured as failures in the error log: Optic GA (global alignment); Optic PR (pattern recognition); SEM (scanning electron microscope) GA; SEM PR; Measurement; Manual Measurement; and Others.

The Optic GA and Optic PR errors may occur while the metrology recipe is determining how to calculate and remove the wafer-loading rotation error using pattern recognition prior to making measurements using an optical microscope. Next, using the CD SEM metrology tool, the optical microscope is switched to the electron microscope where a higher magnification global alignment can be used to make even finer corrections to any loading errors in the wafer. Once all optical and SEM GA activities have finished, the measurements of the microelectronic features may begin. Each process parameter being measured (critical dimension in the case of the CD SEM) typically has a pattern recognition step (SEM PR) and then a feature measurement (Measurement) is made. This process is repeated many times over the wafer until all required microelectronic feature measurements are made. Any (or all) of the aforementioned steps may fail. Another type of error occurs when an automatic measurement cannot be made and a manual measurement is invoked (Manual Measurement). There may be other recipe failure types that can be categorized under the Other category.

The metrology tool system may comprise a single metrology tool or a plurality of metrology tools connected by a network, such as a local area network (LAN) or even the Internet. As shown in FIG. 1, metrology tool system 20 comprises metrology tools 24a, 24b, 24c connected by network 32 to controller 26, which contains microprocessor 28 and has access to database 30. Tools 24a, 24b, 24c run individual recipes from database 30, as directed by the microprocessor of controller 26, to make measurements of one or more dimensions of microelectronic features on wafers 22a, 22b, 22c, respectively. Recipe and non-recipe failures encountered by the metrology tools in making the microelectronic feature measurements are stored in an error log database 30.

In practicing the preferred method of the present invention, each of the recipe failure categories can be summarized for a given recipe that has run many times over a period of time. This summary guides the user to determine what to repair in the recipe as identified as having a high degree of failure. Other categories of information may be summarized in a metrology tool error log.

Figure 2:
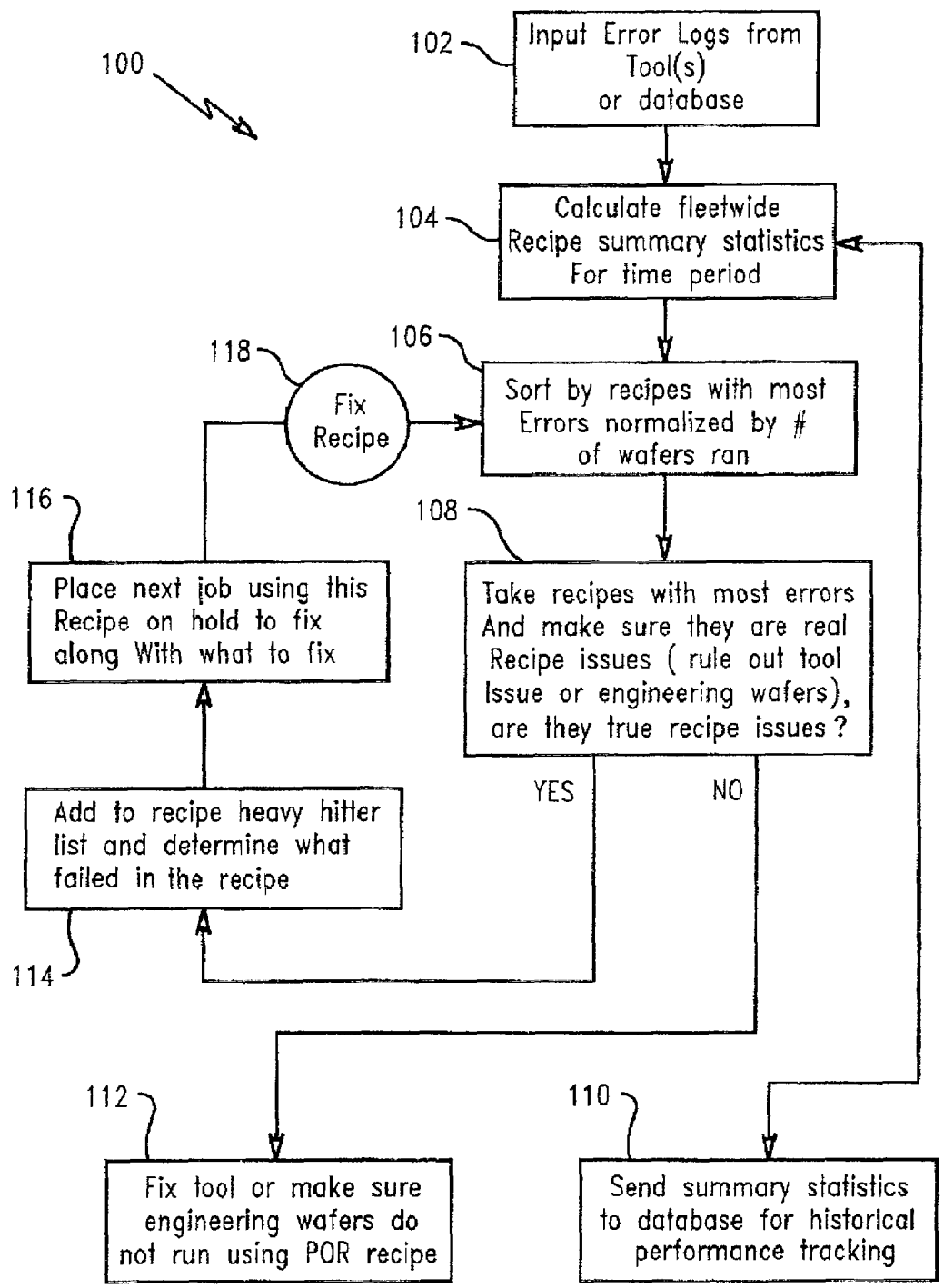
FIG. 2 is a flowchart showing the preferred general method of identifying failures in a metrology tool used to measure desired dimensions in microelectronic features, in accordance with the present invention.

The preferred method 100 of identifying failures in a metrology tool system used to measure desired dimensions in microelectronic features is shown in FIG. 2. The method begins with the raw error log information 102 stored on a database associated with the metrology tool system or another database to which the data was previously downloaded, such as database 30 (FIG. 1). The data information is then accessed, and summary statistics are calculated 104 for each recipe for a given time period. If a plurality of metrology tools is networked in the system, as in the example here, fleet-wide statistics are calculated for all of the tools. Examples of such statistics are total number of failures, number of wafers run, number of failures per wafer, average time it took each wafer to run, 3 sigma of wafer run times, range of wafer run times, and the like. Many of these statistics can be used as diagnostics for further diagnosis of cycle time issues. Preferably, these summarized statistics are sent 110 to the database for historical analysis purposes, which can be used to determine and verify whether recipes fixed over time remain fixed.

The recipes are sorted 106 for given time period by those with most errors per wafers run or by other normalized standard to determine which recipes failed most. The most problematic recipes are identified 108 and verified to be actual recipe issues before being addressed. This step rules out that a particular tool or tools caused the majority of failures because there were tool issues, and rules out whether some wafers that had the majority of errors were deviated engineering wafers using a process of record (POR) metrology recipe.

If recipe issues did not cause the failures, the other issues are instead addressed 112. This eliminates wasting time fixing the recipe, if some other issues would explain the failures. If recipe issues caused the failures, the recipe is added 114 to a list of recipes that have the most normalized failures and need fixing, i.e., the so-called heavy hitter list. In this step one may also analyze the failed recipe by categorizing how many failures were received per the type of category discussed above.

Once the recipes that need repair are identified, the next job coming into a metrology tool using this recipe is identified and the recipe therein is placed on hold to be fixed 116. The particular part of the recipe(s) that needs to be fixed is also noted. Subsequently, the identified recipe(s) that need repair are then analyzed to determine the cause of errors, and a change is effected and the errors are corrected 118. The analysis and repair may also be made prior to identifying the list of jobs to be run with the recipe(s) needing repair. The metrology tool jobs using the recipe are then tracked to determine whether the cause of errors has been corrected.

The method of identifying and repairing metrology tool recipes returns to step 104 and keeps iterating to generate a list of a number n of recipes that have the most normalized errors, e.g., a top 10 list, for a given time period. The method is revisited consistently over time to reduce the recipes that are most problematic.

Figure 3:
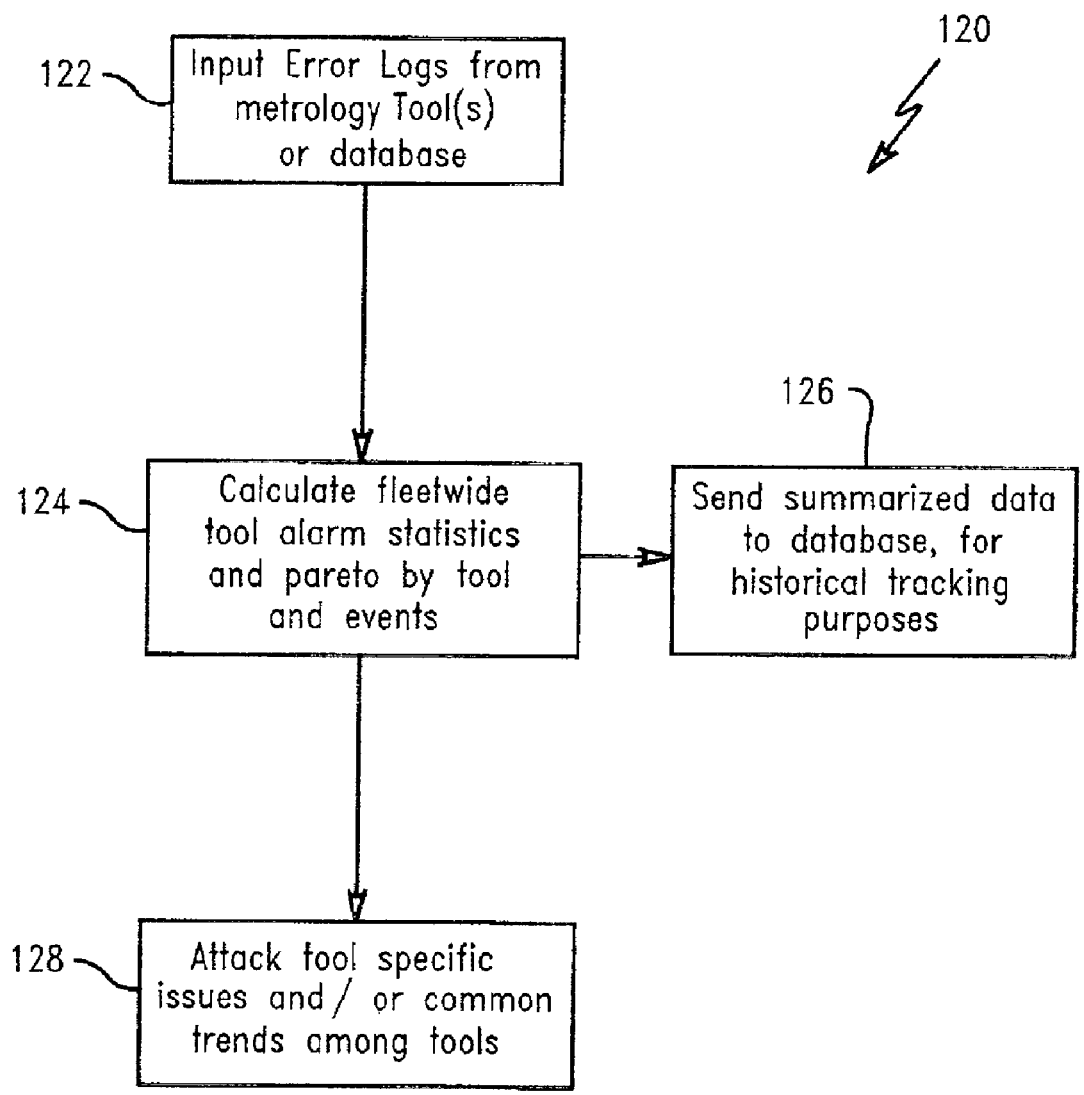
FIG. 3 is a flowchart showing the preferred method of identifying specific problem areas in one or more metrology tools in a metrology tool system.

In parallel with the method of addressing recipe failures of FIG. 2, the method of the present invention also provides a method 120 of identifying non-recipe based metrology tool failures or alarm information regarding-specific tool problems such as reboots, hardware or software failures, and the like, as shown in FIG. 3. Initially, the raw error log information for such non-recipe based metrology tool failures is input from the database 122, i.e., that information that is stored on a database associated with the metrology tool system or another database to which the data was previously downloaded. After the data information is accessed, summary statistics are then calculated 124 for each non-recipe tool failure. The unique tool alarms are categorized and counted over given time periods, by tool, and fleet-wide statistics are calculated for the tools in the system. Summarized data is sent to a database 126 to track tool performance over time with respect to non-recipe based metrology tool failures 126. The non-recipe based metrology tool failures are then studied and solved, preferably on the priority of the tools with most problems over a given time period.

The present invention can take the form of an entirely hardware embodiment, e.g., the database of the metrology tool system, an entirely software embodiment or an embodiment containing both hardware and software elements. In a preferred embodiment, the method of the present invention described above is implemented in software, which includes but is not limited to firmware, resident software, microcode, or other computer usable program code.

Furthermore, the invention can take the form of a computer program product accessible from a computer-usable or computer-readable medium providing program code, such as database 30, for use by or in connection with a computer or any instruction execution system, such as controller 26 and microprocessor 28, as shown in FIG. 1. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared or semiconductor system (or apparatus or device) or a propagation medium. Examples of computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor, such as microprocessor 28, coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/Output or I/O devices of the metrology tools and system controller (including but not limited to keyboards, displays, pointing devices, etc.) can be coupled to the system either directly or through intervening I/O controllers.

Network adapters may also be coupled to the system network 32 to enable the data processing system to become coupled to other data processing systems or remote printers or storage devices through intervening private or public networks. Modems, cable modem and Ethernet cards are just a few of the currently available types of network adapters. Preferably, the program embodying the method of the present invention permits remote analysis of tool error logs, allows analysis of previously downloaded tool error logs, and connects to the database of error logs to allow probing of historical data regarding recipe and non-recipe based metrology tool failures. In the analysis of tool error logs, the error log data may be downloaded to a remote computer 34 for immediate or future analysis.

The analysis of tool error logs can provide lists of total tool system errors and identification of recipes having the most normalized errors, as well as a summary of errors for each individual tool in the system along with information on each wafer lot run by that tool, e.g., chronological ordering of lots, respective number of errors, and the processing time. The analysis may also provide identification of errors by category, e.g., Optic GA, Optic PR, SEM GA, and the like, to provide direction for which recipes and problems should be addressed first. Analysis of wafer lots also provides information on whether production or engineering jobs were responsible for the majority of recipe failures. Non-recipe based tool failures may also be analyzed in this manner.

Thus, the present invention provides a method of identifying the most problematic recipes that need to be fixed from analysis of numerous metrology tool recipe failures, as well as a method of determining where to begin the process of fixing metrology tool recipes that have failed. The invention provides an automated method of converging on the most problematic metrology tool recipes and determining root cause, and identifying and repairing metrology tool recipe failures, using error logs that exist on current metrology tools.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of identifying failures in a metrology tool used to measure desired dimensions in microelectronic features comprising:

providing a metrology tool running a plurality of recipes for measuring desired dimensions in microelectronic features, each recipe comprising a set of instructions for measuring at least one dimension in a microelectronic feature;

providing an error log for the metrology tool, the error log having stored thereon failures in measurement of microelectronic feature dimensions;

from the failures stored in the error log, determining normalized number of errors for the recipes used by the metrology tool;

identifying one or more recipes having the greatest normalized number of errors in the error log;

identifying, in a list of jobs to be performed by the metrology tool, the one or more identified recipes having the greatest normalized number of errors;

from the identified one or more recipes having the greatest normalized number of errors, determining a cause of the errors in the one or more recipes;

effecting a change in the one or more identified recipes having the greatest normalized number of errors to correct the errors therein; and tracking a metrology tool job having the one or more recipes in which a change has been effected to determine whether the cause of errors has been corrected.

2. The method of claim 1 further including, prior to identifying the recipes having the greatest normalized number of errors, determining whether the errors are caused by a recipe used by the metrology tool, and using only the errors caused by a recipe to identify the one or more recipes having the greatest normalized number of errors and determine the cause of the errors therein.

3. The method of claim 1 further including summarizing failures stored in the error log, and storing summarized failure data in a database.

4. The method of claim 1 wherein there is provided a plurality of the metrology tools, each having a plurality of recipes, wherein the error log has stored thereon failures in measurement of microelectronic feature dimensions for the plurality of metrology tools, and wherein the one or more recipes having the greatest normalized number of errors is identified, and the cause of the errors therein is determined for each metrology tool.

5. The method of claim 1 wherein there is provided a plurality of the metrology tools, each having a plurality of recipes, wherein the error log has stored thereon failures in measurement of microelectronic feature dimensions for the plurality of metrology tools, and including identifying common recipes having errors in a plurality of the metrology tools, and determining the cause of the errors in such common recipes.

6. The method of claim 1 wherein the metrology tool failures stored in the error log include failures selected from a group consisting of hardware failures and software failures, including instances of rebooting.

7. The method of claim 6 further including summarizing failures stored in the error log, and storing summarized failure data in a database.

8. The method of claim 1 further including, prior to identifying the recipes having the greatest normalized number of errors, determining whether the errors are caused by a recipe used by the metrology tool and, if the errors are not caused by a recipe used by the metrology tool, repairing the metrology tool having the failure not caused by a recipe.

9. A method of identifying failures in a metrology tool system used to measure desired dimensions in microelectronic features comprising:

providing a metrology tool system having a plurality of metrology tools, each tool running a plurality of recipes for measuring desired dimensions in microelectronic features, each recipe comprising a set of instructions for measuring at least one dimension in a microelectronic feature;

providing an error log for the metrology tool system, the error log having stored thereon failures in measurement of microelectronic feature dimensions for each metrology tool;

determining whether errors are caused by a recipe used by a metrology tool in the system;

from the failures stored in the error log caused by a recipe, determining normalized number of errors for the recipes used by the metrology tool system;

identifying one or more recipes having the greatest normalized number of errors in the error log;

identifying, in a list of jobs to be performed by the metrology tool system, the one or more identified recipes having the greatest normalized number of errors;

from the identified one or more recipes having the greatest normalized number of errors, determining a cause of the errors in the one or more recipes;

effecting a change in the one or more identified recipes having the greatest normalized number of errors to correct the errors therein; and tracking a metrology tool job having the one or more recipes in which a change has been effected to determine whether the cause of errors has been corrected.

10. The method of claim 9 further including summarizing failures stored in the error log, and storing summarized failure data in a database.

11. The method of claim 9 wherein the metrology tool failures stored in the error log include failures selected from a group consisting of alignment errors, pattern recognition errors and dimensional measurement errors.

12. The method of claim 9 including identifying common recipes having errors in a plurality of the metrology tools in the system, and determining the cause of the errors in such common recipes.

13. The method of claim 9 wherein the metrology tool failures stored in the error log include failures selected from a group consisting of hardware failures and software failures, including instances of rebooting.

14. The method of claim 13 further including summarizing failures stored in the error log, and storing summarized failure data in a database.

15. The method of claim 9 wherein, if the errors are not caused by a recipe used by the metrology tool system, further including repairing the metrology tool having the failure not caused by a recipe.

16. A computer program product comprising a computer useable medium including a computer readable program for identifying failures in a metrology tool system used to measure desired dimensions in microelectronic features, the metrology tool system including a metrology tool adapted to run a plurality of recipes for measuring desired dimensions in microelectronic features, each recipe comprising a set of instructions for measuring at least one dimension in a microelectronic feature, the metrology tool having an error log in a database having stored thereon failures in measurement of microelectronic feature dimensions, wherein the computer readable program when executed on a computer causes the computer to:

determine normalized number of errors for the recipes used by the metrology tool, from the failures stored in the error log;

identify one or more recipes having the greatest normalized number of errors in the error log; and identify, in a list of jobs to be performed by the metrology tool, the one or more identified recipes having the greatest normalized number of errors.

17. The computer program product of claim 16 wherein the computer readable program when executed on the computer further causes the computer to summarize failures stored in the error log, and store summarized failure data in a database.

18. The computer program product of claim 16 wherein the metrology tool system includes a plurality of the metrology tools, each having a plurality of recipes, wherein the error log has stored thereon failures in measurement of microelectronic feature dimensions for the plurality of metrology tools, and wherein the one or more recipes having the greatest normalized number of errors is identified for the metrology tools.

19. The computer program product of claim 16 wherein the metrology tool failures stored in the error log include failures selected from the group consisting of hardware failures and software failures, including instances of rebooting.

20. The computer program product of claim 19 wherein the computer readable program when executed on the computer further causes the computer to summarize failures stored in the error log, and store summarized failure data in a database.

* * * * *